US008817052B2

(12) United States Patent
Kudo et al.

(10) Patent No.: US 8,817,052 B2
(45) Date of Patent: Aug. 26, 2014

(54) INFORMATION PROCESSING APPARATUS, IMAGE ENLARGEMENT PROCESSING METHOD, AND COMPUTER PROGRAM PRODUCT WITH VISIBLE DATA AREA ENLARGEMENT FEATURES

(75) Inventors: Shunsuke Kudo, Kanagawa (JP); Izuru Tanaka, Kanagawa (JP); Takayuki Yumoto, San Diego, CA (US)

(73) Assignees: Sony Corporation, Tokyo (JP); Sony Electronics, Inc., Parkridge, NJ (US)

( * ) Notice: Subject to any disclaimer, the term of this patent is extended or adjusted under 35 U.S.C. 154(b) by 239 days.

(21) Appl. No.: 12/878,118

(22) Filed: Sep. 9, 2010

(65) Prior Publication Data

US 2011/0102467 A1    May 5, 2011

Related U.S. Application Data

(60) Provisional application No. 61/257,304, filed on Nov. 2, 2009.

(51) Int. Cl.
*G06T 3/40* (2006.01)

(52) U.S. Cl.
USPC ............................ 345/660; 345/662; 345/472

(58) Field of Classification Search
None
See application file for complete search history.

(56) References Cited

U.S. PATENT DOCUMENTS

| | | | |
|---|---|---|---|
| 6,400,852 B1 * | 6/2002 | Miller et al. | 382/298 |
| 6,414,698 B1 * | 7/2002 | Lovell et al. | 715/800 |
| 6,466,203 B2 * | 10/2002 | Van Ee | 345/173 |
| 6,560,376 B2 * | 5/2003 | Kimbell et al. | 382/296 |
| 6,747,680 B1 * | 6/2004 | Igarashi et al. | 715/784 |
| 2004/0135813 A1 * | 7/2004 | Kanai | 345/781 |
| 2005/0174362 A1 * | 8/2005 | Lee et al. | 345/660 |
| 2006/0146016 A1 * | 7/2006 | Chan et al. | 345/156 |
| 2007/0036468 A1 * | 2/2007 | Matsushita et al. | 382/305 |
| 2007/0150829 A1 * | 6/2007 | Eschbach et al. | 715/781 |
| 2008/0252662 A1 * | 10/2008 | Hyatt | 345/660 |
| 2009/0058884 A1 * | 3/2009 | Li et al. | 345/660 |
| 2009/0113291 A1 * | 4/2009 | Barclay et al. | 715/243 |
| 2009/0189920 A1 * | 7/2009 | Chiu et al. | 345/662 |
| 2010/0189345 A1 * | 7/2010 | Reddy et al. | 382/164 |
| 2010/0201711 A1 * | 8/2010 | Fillion et al. | 345/660 |

OTHER PUBLICATIONS

Adobe Acrobat 7.0 Standard (released Jan. 2005) help.adobe.com/archive/en_US/acrobat/7/standard/ACROHELP.PDF.*
Adobe Acrobat 7.0 Standard (released Jan. 2005) help.adobe.com/archive/en_US/acrobat/7/standard/ACROH ELP.PDF Full document.*

* cited by examiner

*Primary Examiner* — David Zarka
*Assistant Examiner* — Jason Pringle-Parker
(74) *Attorney, Agent, or Firm* — Oblon, Spivak, McClelland, Maier & Neustadt, L.L.P.

(57) ABSTRACT

An information processing apparatus includes a display section, a generation section, a determination section, and a control section. The display section includes a screen. The generation section generates an image of content data including visible data. The determination section determines an area surrounding an area in which the visible data is arranged in the generated image and corresponding to a shape of the screen, as a visible data area. The control section generates, by the generation section, an enlarged image obtained by enlarging the image so that a size of the screen and a size of the visible data area become close to each other, determines, by the determination section, the visible data area in the enlarged image, and extracts the visible data area from the enlarged image to display the visible data area on the screen.

15 Claims, 14 Drawing Sheets

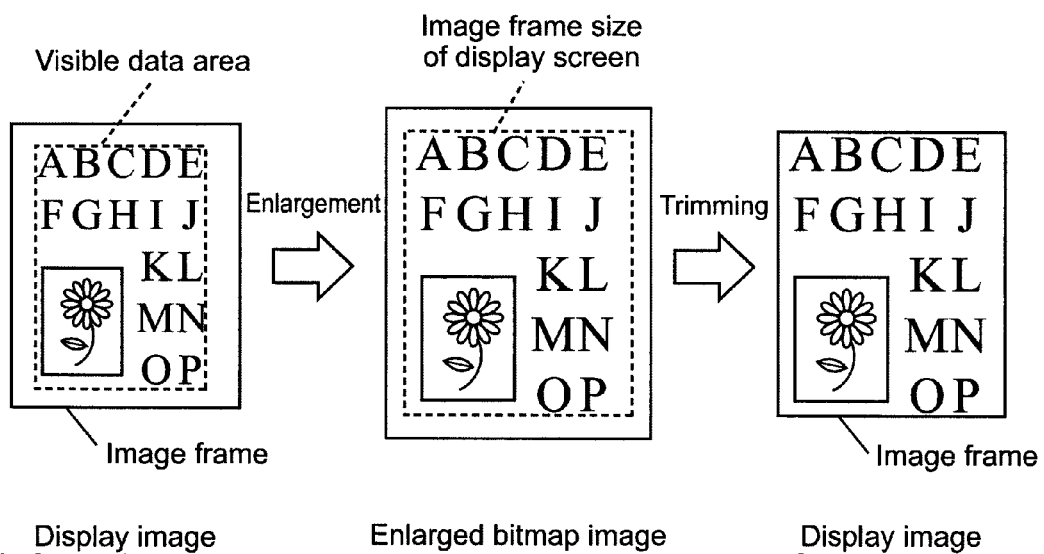
FIG.7A Display image before enlargement
FIG.7B Enlarged bitmap image
FIG.7C Display image after enlargement Enlargement condition 1
Before enlargement    After enlargement
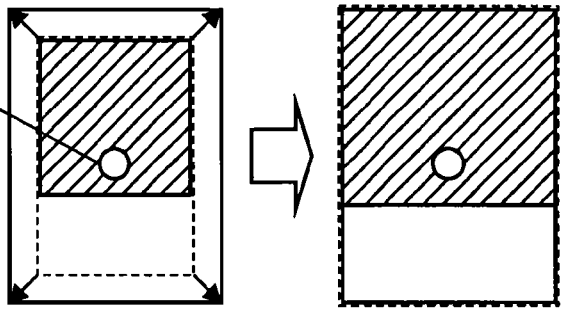
Center of image frame
FIG.8A
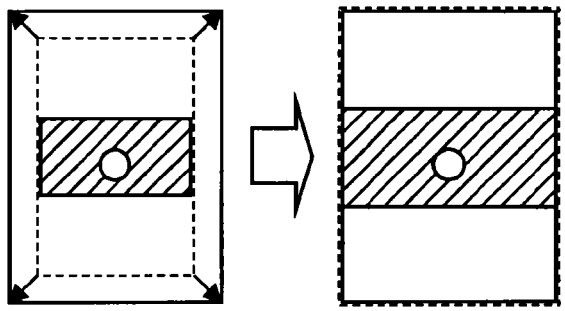
FIG.8B
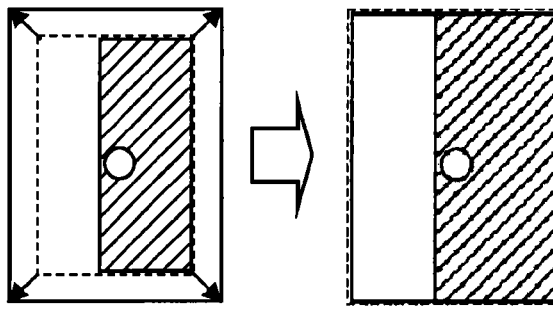
FIG.8C
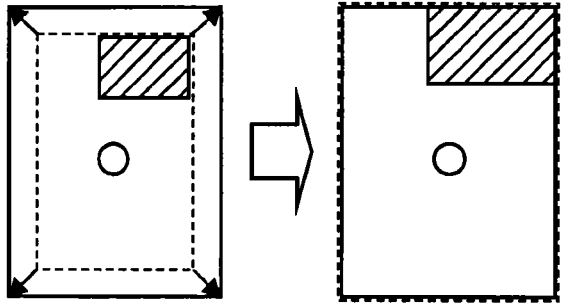
FIG.8D
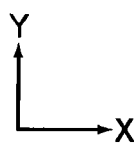

Enlargement condition 2
Before enlargement    After enlargement
Center of image frame
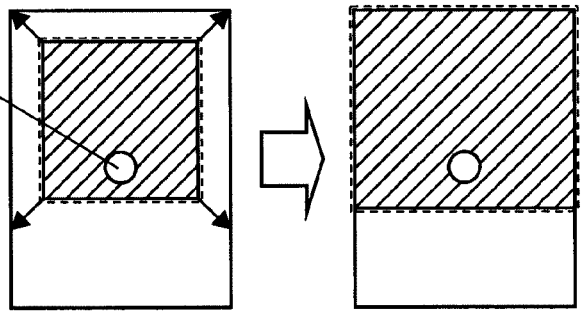
FIG.9A
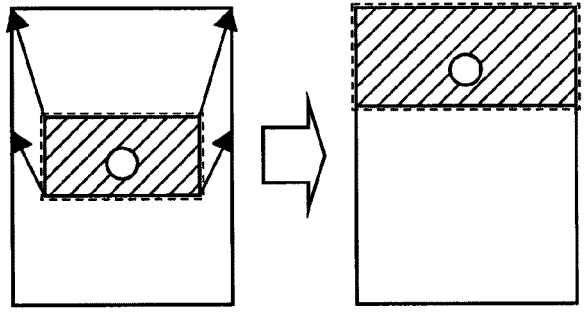
FIG.9B
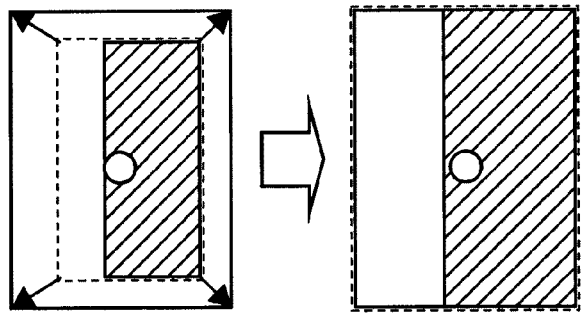
FIG.9C
FIG.9D
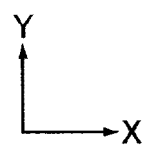

Enlargement condition 3
Before enlargement   After enlargement
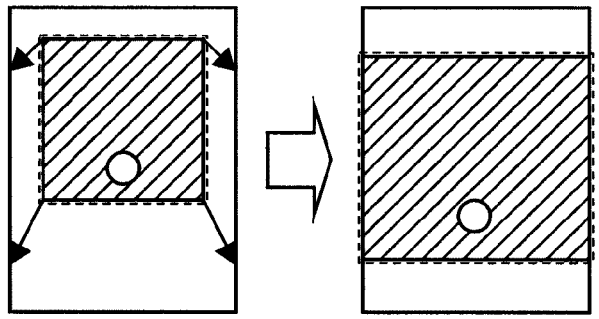
FIG.10A
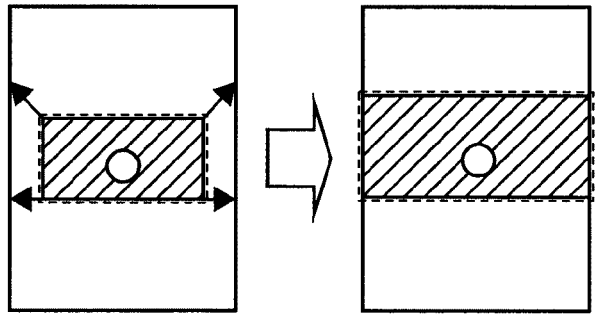
FIG.10B
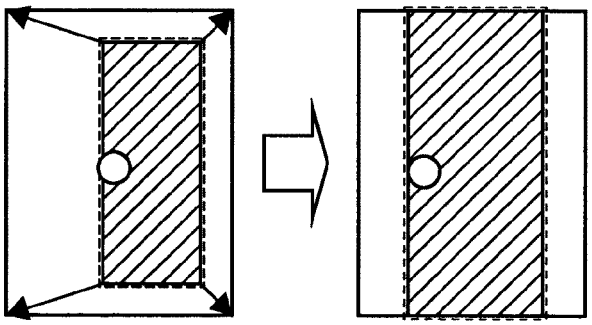
FIG.10C
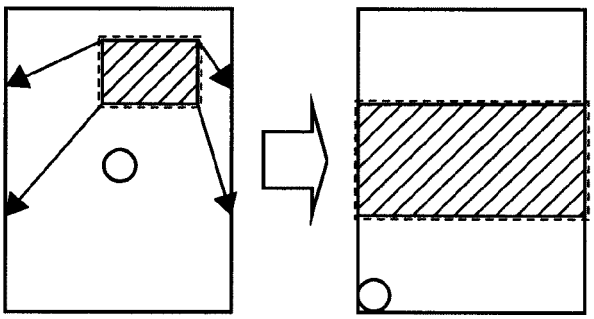
FIG.10D
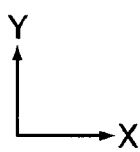

Enlargement condition 4
Before enlargement    After enlargement

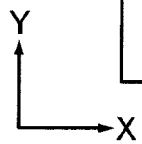

INFORMATION PROCESSING APPARATUS, IMAGE ENLARGEMENT PROCESSING METHOD, AND COMPUTER PROGRAM PRODUCT WITH VISIBLE DATA AREA ENLARGEMENT FEATURES

BACKGROUND OF THE INVENTION

1. Field of the Invention

The present invention relates to an information processing apparatus that displays content data such as electronic book data, and an image enlargement processing method and program therefor.

2. Description of the Related Art

Paper-based contents such as books are being distributed through electronic transmission media such as networks and various storage media due to conversion of the contents into electronic data. Such electronic content data is imported to an information processing apparatus such as a personal computer of a user, and analyzed by a viewer means provided as an application program, thus being displayed as an image on a display.

In recent years, there has been provided an electronic book reader that is a dedicated apparatus for mainly viewing electronic content data as described above.

The electronic book reader has substantially the same shape, size, and weight as an actual book, and can be used as if a user carried an actual book. Further, in the electronic book reader, an enlargement ratio of display, brightness or contrast of a display, and the like are freely selected on the user side. Accordingly, various users can view pages on optimum conditions.

SUMMARY OF THE INVENTION

Generally, the enlargement of display is to merely enlarge a bitmap image. Accordingly, in a case where a bitmap image is enlarged larger than a size of an image frame of a physical display screen, an area of the bitmap image that is expanded outside the image frame of the physical display screen is not viewed. In order to view the area expanded outside the image frame of the display screen, for example, it is necessary to make a scroll operation on the screen. Particularly in a case where book data is viewed, the scroll operation is needed with frequency, which impairs the operability. In this regard, a method of increasing an enlargement ratio gradually each time a user inputs an enlargement instruction is conceivable. However, in this case, the user needs to input the enlargement instruction repeatedly up until an ideal size for the user is obtained, which is still poor in operability.

In view of the circumstances as described above, there is a need for an information processing apparatus capable of uniquely obtaining a display image of content data enlarged while making almost full use of a screen, and an image enlargement processing method and program therefor.

According to an embodiment of the present invention, there is provided an information processing apparatus including a display means including a screen, a generation means for generating an image of content data including visible data, a determination means for determining an area surrounding an area in which the visible data is arranged in the generated image and corresponding to a shape of the screen, as a visible data area, and a control means for generating, by the generation means, an enlarged image obtained by enlarging the image so that a size of the screen and a size of the visible data area become close to each other, determining, by the determination means, the visible data area in the enlarged image, and extracting the visible data area from the enlarged image to display the visible data area on the screen.

According to the information processing apparatus of the embodiment of the present invention, it is possible to uniquely obtain a display image of the content data enlarged by making almost full use of the screen.

The information processing apparatus according to the embodiment of the present invention may further include a storage means for storing an enlargement ratio used for generating the enlarged image by the generation means. When the image of the content data is divided into a plurality of pages to be displayed on the screen, the control means may store, by the storage means, the enlargement ratio used for generating the enlarged image of a previous page and generate, by the generation means, the enlarged image of a next page by using the stored enlargement ratio.

In the embodiment of the present invention, when a layout of the next page is the same as that of the previous page, it is possible to obtain a display image of the content data enlarged by making almost full use of the screen without calculating a new enlargement ratio again.

When a difference between the size of the screen and the size of the visible data area is larger than a threshold value, the control means may generate, by the generation means, the enlarged image obtained by enlarging the image so that both the sizes become close to each other, determine, by the determination means, the visible data area in the enlarged image, and extract the visible data area from the enlarged image to display the visible data area on the screen, and when the difference between the size of the screen and the size of the visible data area is equal to or smaller than the threshold value, the control means extracts the visible data area from the image to display the visible data area on the screen.

In the embodiment of the present invention, the enlarged image obtained by enlarging the image may be generated only when the difference between the size of the screen and the size of the visible data area is larger than the threshold value. Accordingly, it is unnecessary to generate an enlarged image uselessly, which increases a processing efficiency.

The control means may generate, by the generation means, the enlarged image that is enlarged with a center position of the image being fixed. In a case where this enlargement method is adopted, and in particular, the content data includes various layouts as in a case of electronic book data, the feature of the layouts is scarcely changed before and after the enlargement, and thus the image can be enlarged without causing unconformable feeling.

According to the embodiment of the present invention, it is possible to uniquely obtain a display image of content data enlarged by making almost full use of a screen.

These and other objects, features and advantages of the present invention will become more apparent in light of the following detailed description of best mode embodiments thereof, as illustrated in the accompanying drawings.

BRIEF DESCRIPTION OF DRAWINGS

FIG. 7 are diagrams showing an example of the full-screen enlargement of page;

FIG. 8 are diagrams showing an enlargement condition 1;

FIG. 9 are diagrams showing an enlargement condition 2;

FIG. 10 are diagrams showing an enlargement condition 3;

DESCRIPTION OF PREFERRED EMBODIMENTS

Hereinafter, an embodiment of the present invention will be described with reference to the drawings.
(First Embodiment)

Figure 1:
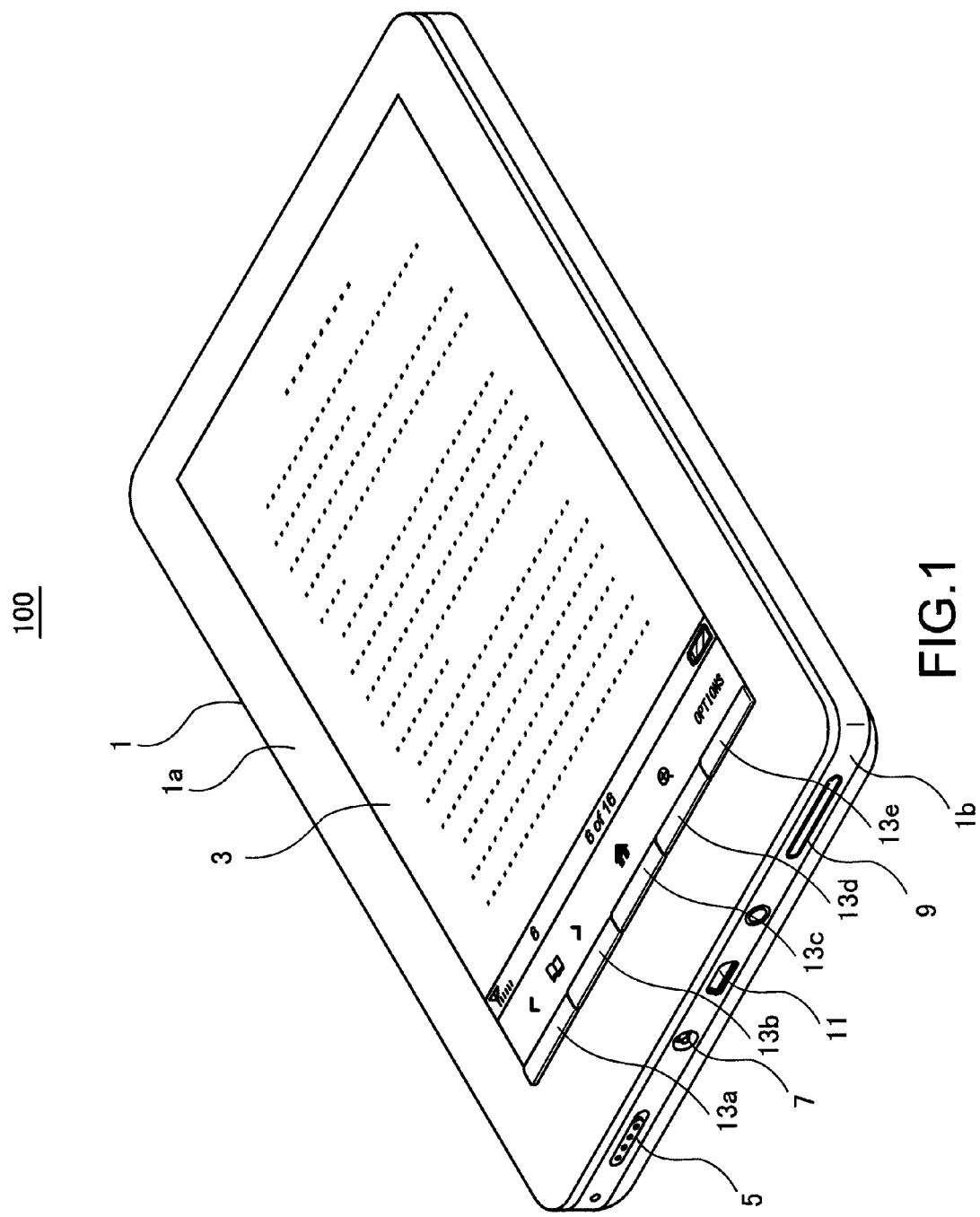
FIG. 1 is an appearance perspective view of an electronic book reader according to a first embodiment of the present invention.
Figure 2:
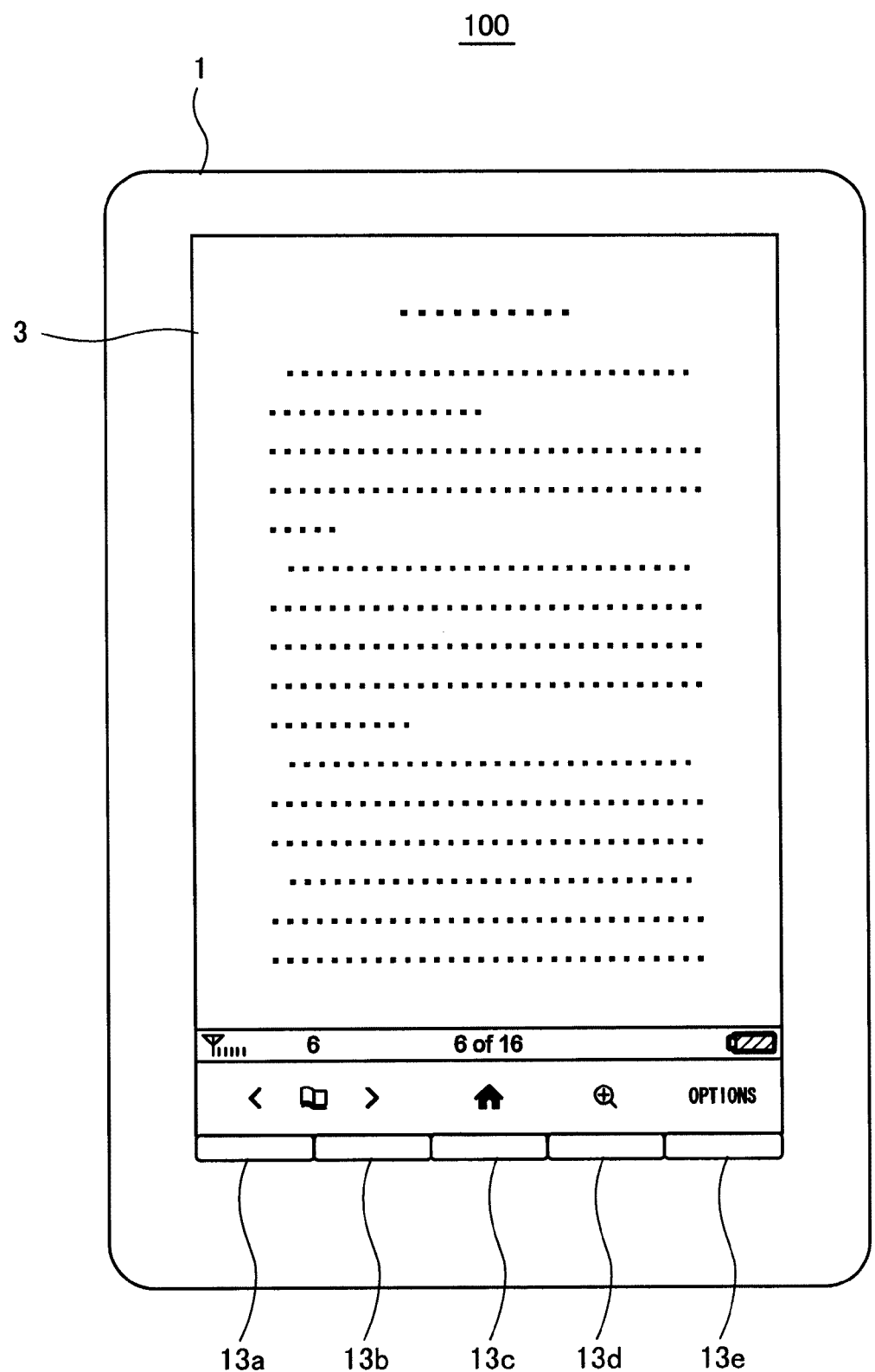
FIG. 2 is a plan view of the electronic book reader of FIG. 1.

FIG. 1 is an appearance perspective view of an electronic book reader as an information processing apparatus according to a first embodiment of the present invention, and FIG. 2 is a plan view thereof.

An electronic book reader 100 of this embodiment is an apparatus capable of acquiring content data such as electronic book data via a network or a storage medium and generating a bitmap image of the content data, to thereby display the bitmap image on a display screen, for example. The electronic book data may include image data, a header, and the like in addition to text data. As a format of the electronic book data, there is an ePUB (electronic publication) or the like. The ePUB is a standard specification of e-book, established by the International Digital Publishing Forum (IDPF).

The electronic book reader 100 includes a casing 1 that has a thin rectangular shape, as shown in FIGS. 1 and 2. The casing 1 has a size enough to be held by one hand of a user. The casing 1 includes a main surface 1a on which a display 3 is disposed. The display 3 is a thin display such as a liquid crystal display. A sensor touch panel is provided to the display 3 in an overlapping manner. Out of four side surfaces that are orthogonal to the main surface 1a, a side surface 1b is provided with a power source button 5, a DC input plug connection portion 7, a media interface for carrying out read and write with respect to card-type media (not shown), a network interface 9 for a wireless connection with a network, an external connection interface such as a USB (Universal Serial Bus), and the like.

The electronic book reader 100 can import content data such as electronic book data by selectively using those above interfaces. Further, on the main surface 1a of the casing 1, below the area in which the display 3 is disposed, there are provided a plurality of buttons 13a to 13e for receiving instructions for various operations and settings that are needed when a user views the content data. For example, the buttons are a page-forward button 13b, a page-reverse button 13a, a home button 13c, a switch button for switching page to enlargement/reduction operation screen 13d, a setting button 13e, and the like. Here, the "page" refers to a bitmap image displayed on the display screen in the content data such as electronic book data.

Figure 3:
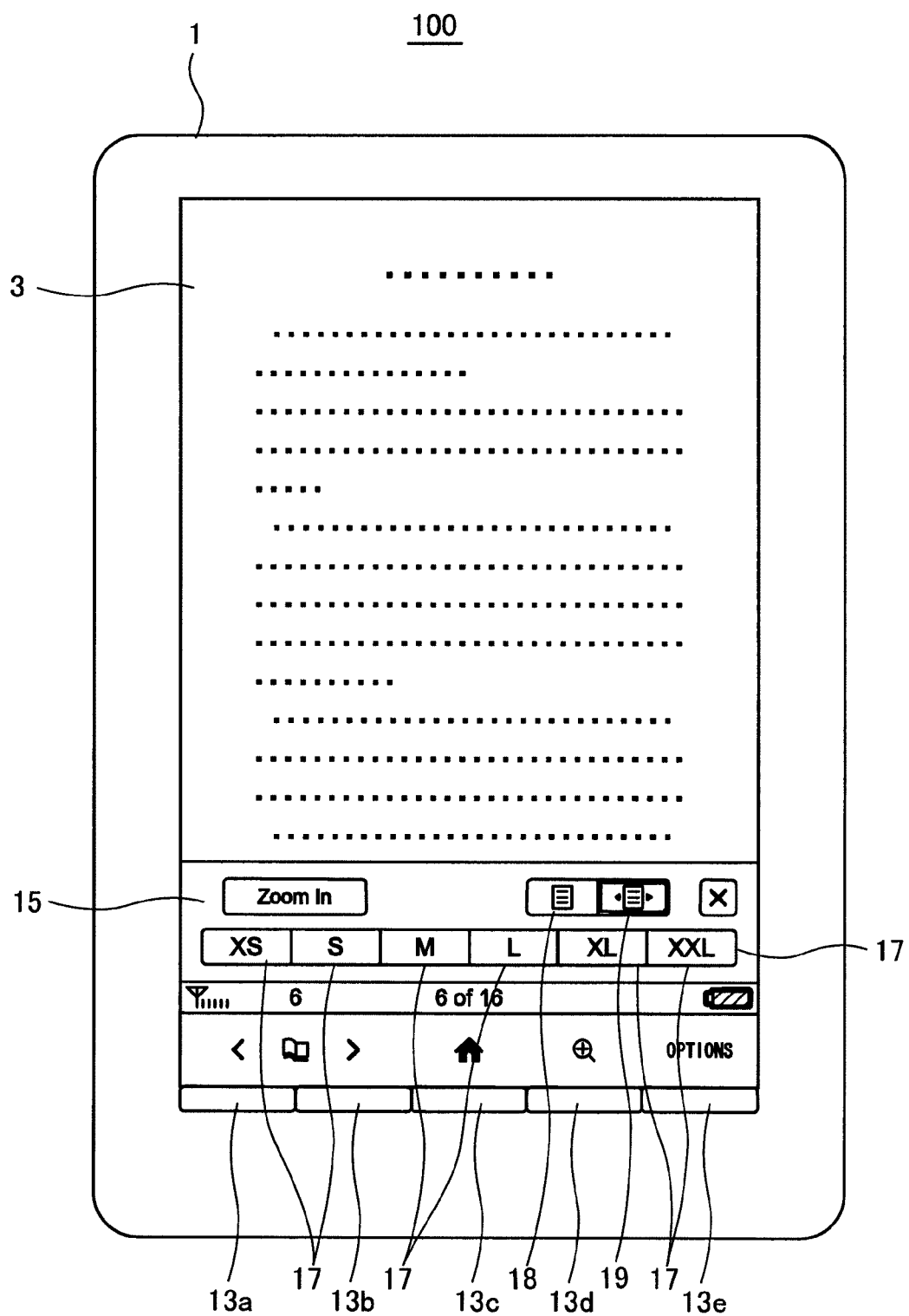
FIG. 3 is a plan view showing an enlargement/reduction operation screen of the electronic book reader of FIG. 1.

When a user makes a touch operation to the switch button 13d, an enlargement/reduction operation screen for prompting the user to select detailed instructions to enlarge/reduce a page is displayed in a predetermined area of the screen of the display 3. FIG. 3 is a view showing a state where this enlargement/reduction operation screen 15 is displayed on the screen of the display 3. The enlargement/reduction operation screen 15 detects an area touched by the user using a finger or a touch pen on the touch sensor panel and notifies a CPU (Central Processing Unit) of a command for an enlargement/reduction operation assigned to the detected area. More specifically, the enlargement/reduction operation screen 15 includes a plurality of enlargement/reduction instruction areas 17, a full-screen enlargement instruction area 18, an enlargement cancel area 19, and the like. To each of the enlargement/reduction instruction areas 17, a command for enlarging or reducing a bitmap image of content data at a fixed ratio determined for each area is assigned. To the full-screen enlargement instruction area 18, a command for enlarging the bitmap image of the content data by making almost full use of an image frame of the screen of the display 3 is assigned. The enlargement cancel area 19 cancels the full-screen enlargement.

Figure 4:
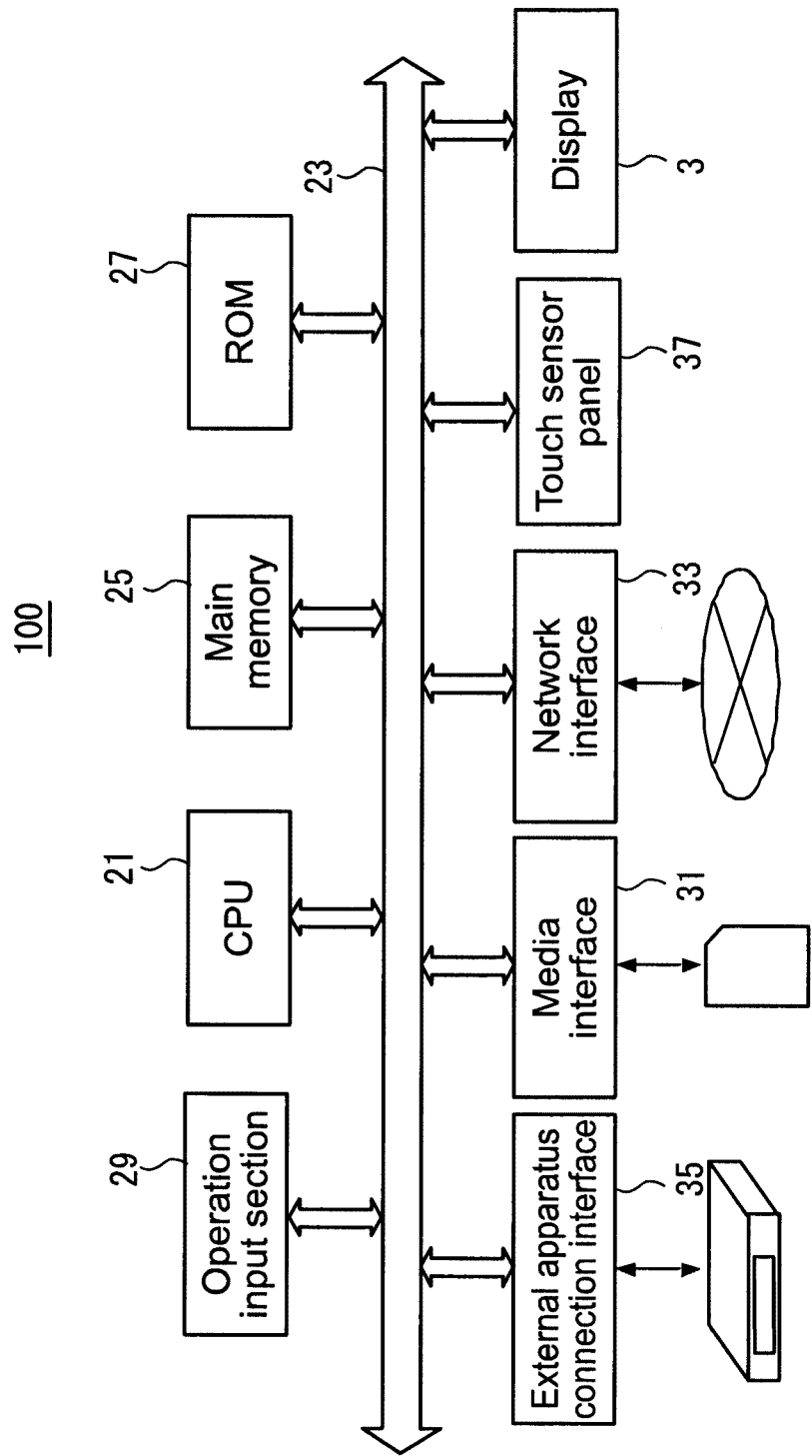
FIG. 4 is a block diagram showing an electric structure of the electronic book reader of FIG. 1.

FIG. 4 is a block diagram showing an electric structure of the electronic book reader 100.

As shown in FIG. 4, the electronic book reader 100 includes a CPU 21, a system bus 23, a main memory 25, a ROM (Read Only Memory) 27, the display 3, an operation input section 29, a media interface 31, a network interface 33, an external apparatus connection interface 35, a touch sensor panel 37, and the like. In other words, the electronic book reader 100 has the structure of a typical computer. The electronic book reader 100 includes a battery and the like in addition to those above, and can also be used in a location where a commercial power source is not available.

The main memory 25 is used as an area for operation processing that is necessary for executing a program to cause the computer to operate as the electronic book reader 100 or a display area in which data of a bitmap image is developed. Further, the main memory 25 stores content data such as electronic book data. The ROM 27 stores the program described above or the like in a fixed manner. According to the program, the CPU 21 executes generation of a bitmap image from the content data, display of the bitmap image on the display 3, enlargement/reduction of the displayed bitmap image, and other necessary operation processing. The display 3 is a liquid crystal display, for example, and displays a bitmap image of content data and various operation screens such as the enlargement/reduction operation screen 15 and other menu screens. The operation input section 29 detects operations states of the plurality of buttons 13a to 13e for receiving instructions for various operations and settings and notifies the CPU 21 of results of the detection. The media interface 31, the network interface 33, and the external apparatus connection interface 35 operate as described above.
(Full-Screen Enlargement of Page)

Next, the full-screen enlargement of page by the electronic book reader 100 of this embodiment will be described.

When a touch operation is made to the full-screen enlargement instruction area 18 displayed on the display 3 as shown in FIG. 3 by the user with a finger or a pen, the electronic book reader 100 executes full-screen enlargement of page, that is, processing of enlarging a bitmap image of content data by making almost full use of an image frame of the screen of the display 3.

Figure 5:
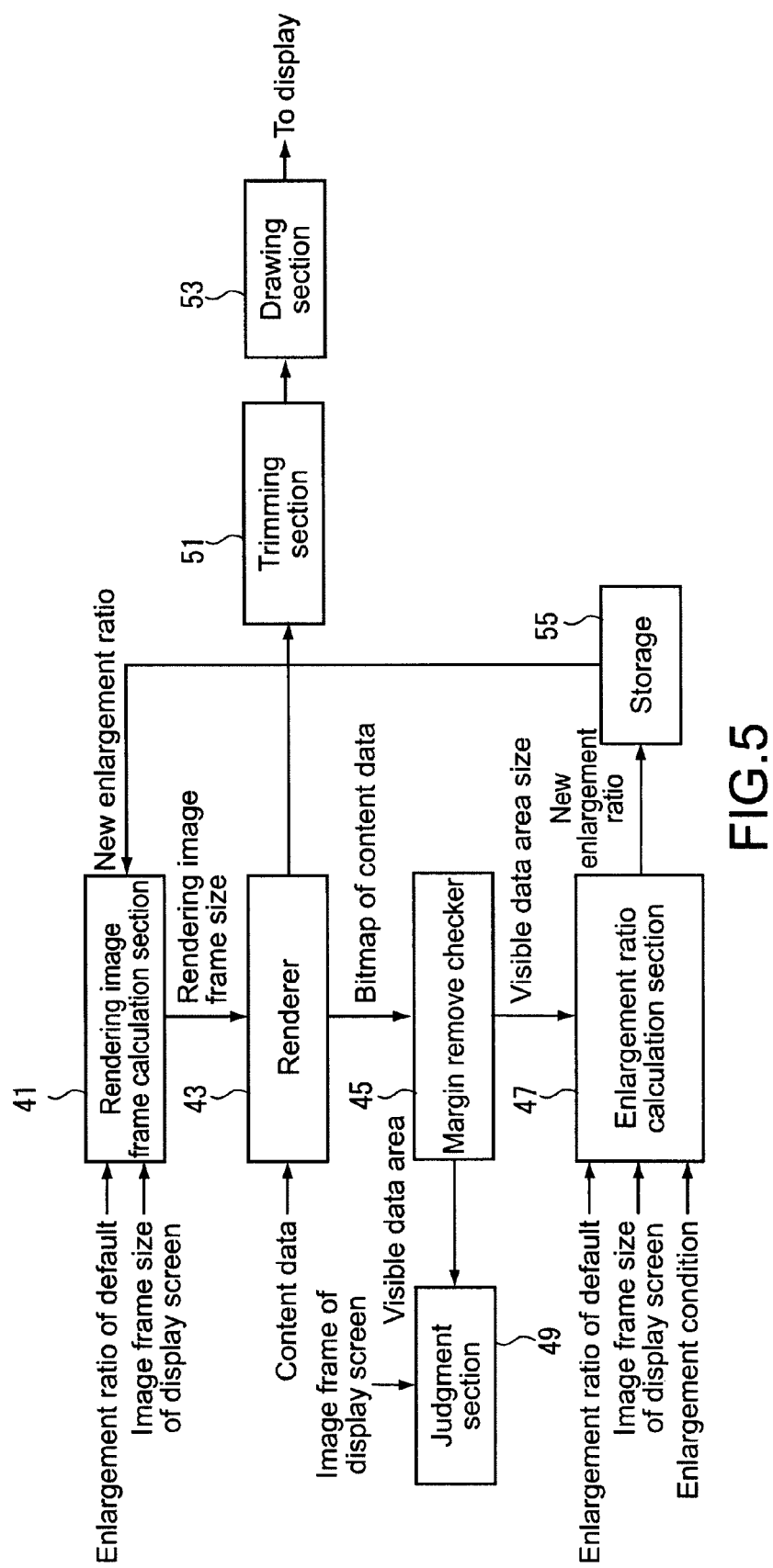
FIG. 5 is a block diagram showing the structure of software for full-screen enlargement of page in the electronic book reader of FIG. 1.

FIG. 5 is a block diagram showing the structure of software for the full-screen enlargement of page in the electronic book reader 100 of this embodiment.

As shown in FIG. 5, the software for the full-screen enlargement of page in the electronic book reader 100 includes a rendering image frame calculation section 41, a renderer 43, a margin remove checker 45, an enlargement ratio calculation section 47, a judgment section 49, a trimming section 51, a drawing section 53, and a storage 55. Here, the rendering image frame calculation section 41 and the renderer 43 correspond to a generation means. The margin remove checker 45 corresponds to a determination means. The enlargement ratio calculation section 47, the judgment section 49, the trimming section 51, and the drawing section 53 correspond to a control means. The storage 55 corresponds to a storage means.

The rendering image frame calculation section 41 is a module that calculates a size of a rendering image frame from a size of an image frame on the display screen and an enlargement ratio of default or a new enlargement ratio that is calculated by the enlargement ratio calculation section 47 and then stored in the storage 55.

The renderer 43 is a module that generates a bitmap image of content data based on the content data and the size of the rendering image frame, which is calculated by the rendering image frame calculation section 41.

The margin remove checker 45 is a module that determines, as a visible data area, a rectangular area surrounding an area in which visible data such as a header, image data, and text data are arranged in the bitmap image generated by the renderer 43. Accordingly, a portion obtained by removing the visible data area from the bitmap image is a margin.

The enlargement ratio calculation section 47 is a module that calculates a new enlargement ratio based on a size of the visible data area determined by the margin remove checker 45, the size of the image frame of the display screen, the enlargement ratio of default, an enlargement condition, etc. and stores the new enlargement ratio in the storage 55.

The judgment section 49 is a module that judges whether a distance between the image frame of the display screen and the visible data area on each side of the left and right and the top and bottom (size of margin) is larger than a threshold vale.

The trimming section 51 extracts a bitmap image corresponding to the size of the image frame of the display screen from the bitmap image of the content data.

The drawing section 53 is a module that draws the bitmap image extracted by the trimming section 51 on the display screen.

Those modules described above are stored in the ROM 27 or the like as programs.

Next, the full-screen enlargement of page will be described in detail.

Figure 6:
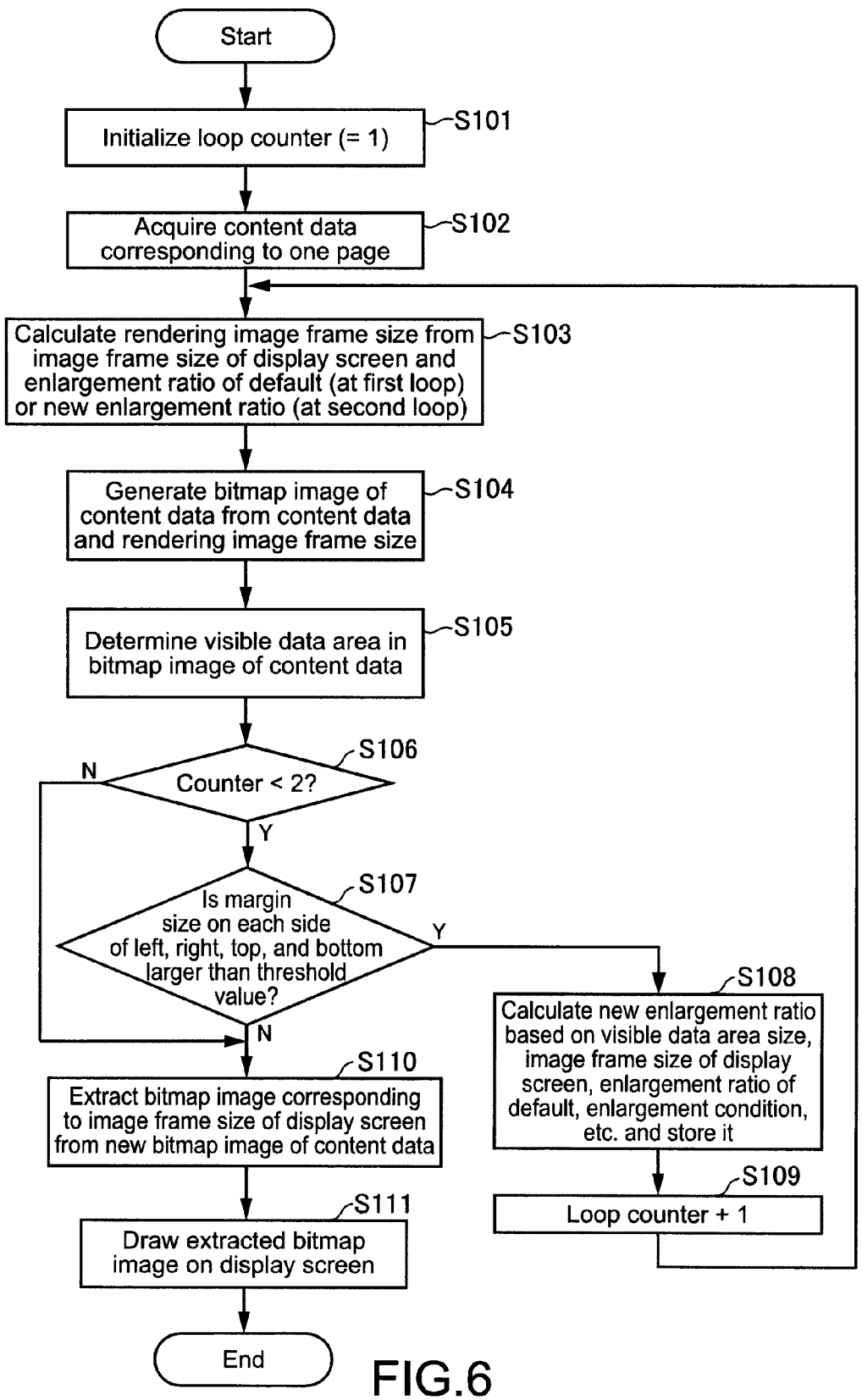
FIG. 6 is a flowchart showing a flow of the full-screen enlargement of page in the electronic book reader of FIG. 1.
Figure 11A:
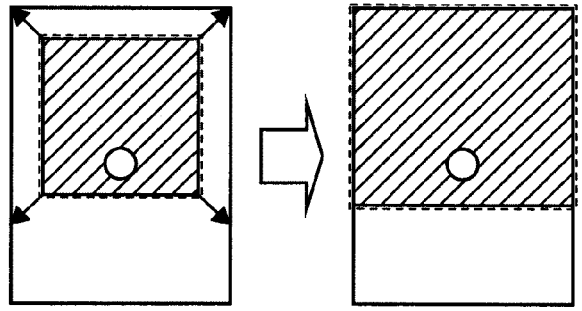
FIG. 11 are diagrams showing an enlargement condition 4.
Figure 11B:
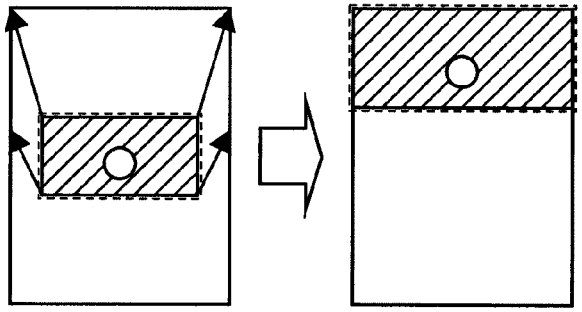
Figure 11C:
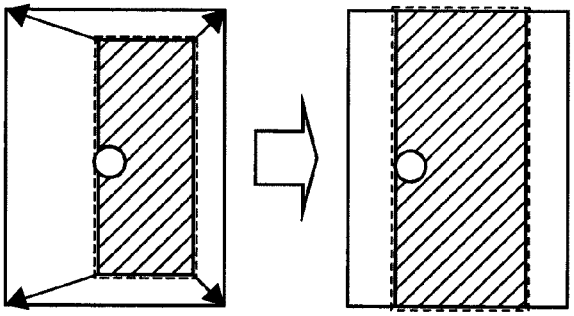
Figure 11D:
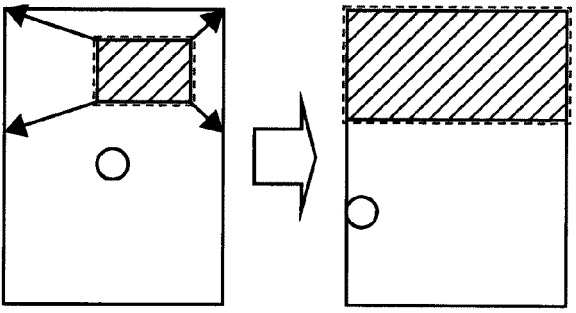

FIG. 6 is a flowchart showing a flow of the full-screen enlargement of page.

Phase 1. When the CPU 21 is notified of the fact that a touch operation is made to the full-screen enlargement instruction area 18 displayed on the screen of the display 3 by the user with the finger or pen, the CPU 21 initializes a loop counter that holds a loop count (Step S101). The default value of the loop counter is "1".

Phase 2. The CPU 21 acquires content data corresponding to one page to be displayed (Step S102).

Phase 3. The CPU 21 calculates, by the rendering image frame calculation section 41, a size of a rendering image frame from a size of an image frame on the display screen and an enlargement ratio of default (Step S103). For example, in a case where 100% is set as an enlargement ratio of default, the size of the image frame on the display screen is set as the size of the rendering image frame as it is.

Phase 4. The CPU 21 generates, by the renderer 43, a bitmap image of the content data based on the content data acquired in Phase 2 and the size of the rendering image frame calculated in Phase 3 (Step S104). In a case where the content data is text data, the rendering is performed while adding in a type and size (point size) of a font, information on letter arrangement (spaces between letters, spaces between lines, etc.), information on decoration of letters (double size, bold type, italic type, etc.), and the like.

Phase 5. The CPU 21 determines, by the margin remove checker 45, a rectangular area surrounding an area in which visible data such as a header, image data, and text data are arranged in the bitmap image of the content data, as a visible data area (Step S105).

Phase 6. The CPU 21 judges where the value of the loop counter is less than "2" (Step S106).

Phase 7. Since the value of the loop counter is "1", that is, less than "2" in the first loop, the CPU 21 judges, by the judgment section 49, whether a distance between the image frame of the display screen and the visible data area on each side of the left and right and the top and bottom (size of margin) is larger than a threshold vale (Step S107).

Phase 8. As the result of the judgment in Step S107, in a case where the distance on each side of the left and right and the top and bottom (size of margin) is the threshold value or less, the CPU 21 extracts a bitmap image corresponding to the size of the image frame of the display screen from the bitmap image of the content data by the trimming section 51 (Step S110).

Phase 9. The CPU 21 draws the bitmap image extracted by the trimming section 51 on the display screen by the drawing section 53 (Step S111).

Phase 10. As the result of the judgment in Step S107, in a case where the distance on each side of the left and right and the top and bottom (size of margin) is larger than the threshold vale, the CPU 21 calculates, by the enlargement ratio calculation section 47, a new enlargement ratio based on a size of the visible data area, the size of the image frame on the display screen, the enlargement ratio of default, an enlargement condition, etc. and stores the new enlargement ratio in the storage 55 (Step S108).

Incidentally, when a bitmap image is generated from content data, the size of the bitmap image may vary at an unignorable level due to a calculation error. So, the CPU 21 calculates, as an enlargement ratio added with a margin corresponding to the calculation error, an enlargement ratio that is slightly smaller than a calculated enlargement ratio obtained by multiplying the enlargement ratio calculated based on the size of the visible data area, the size of the image frame on the display screen, the enlargement ratio of default, and the enlargement condition by, for example, a constant factor by the enlargement ratio calculation section 47. For example, assuming that an enlargement ratio of default is 100% and a calculated enlargement ratio is 110%, 107.8% obtained by multiplying the 110% by a factor of 0.95 is an enlargement ratio to which the margin corresponding to the calculation error is added.

Moreover, the enlargement ratio calculation section 47 is programmed so as to determine a resultant obtained by further adding a restriction of a type of a font size (point size) designated by the content data to the enlargement ratio to which the margin corresponding to the calculation error is added, as a new enlargement ratio. For example, it is assumed that there are fonts of point sizes of "9", "10", "10.5", "11", "12", "14", . . ., and the point size of the font before enlargement is set to "10". Even when the enlargement ratio to which the margin corresponding to the calculation error is added is 107.8%, a font having the point size of "10.5" corresponding to the size of 105% of the font having the point size of "10" before enlargement is used for rendering in this case, and a new enlargement ratio is set to 105% in consequence. Accordingly, it is possible to prevent an actual arrangement area of contents from being expanded outside the display screen and disappearing from view, with high probability.

It should be noted that a new enlargement ratio is also changed by an enlargement condition. This will be described later.

Phase 11. The CPU 21 increments the loop counter (Step S109). As the result of the increment, the value of the loop counter is set to "2".

Phase 12. Returning to Step S103, the CPU 21 calculates, by the rendering image frame calculation section 41, a new size of the rendering image frame from the size of the image frame on the display screen and a new enlargement ratio.

Phase 13. The CPU 21 generates, by the renderer 43, a new bitmap image of the content data based on the content data acquired in Phase 2 and a new size of the rendering image frame calculated in Phase 12 (Step S104). In this case, a font size obtained by the enlargement ratio calculation section 47 is used.

Phase 14. The CPU 21 determines, by the margin remove checker 45, a rectangular area surrounding an area in which the visible data such as a header, image data, and text data are arranged in the new bitmap image of the content data, as a visible data area (Step S105). In this case, the area surrounding the area in which the visible data are arranged is needed to correspond to a shape of the screen of the display 3. Accordingly, the area surrounding the area in which the visible data are arranged is not limited to a rectangular shape.

Phase 15. The CPU 21 judges again whether the value of the loop counter is less than "2" (Step S106).

Phase 16. In a case where the second loop, that is, the value of the loop counter is "2" or more, the CPU 21 extracts a bitmap image corresponding to the size of the image frame of the display screen from the new bitmap image of the content data by the trimming section 51 (Step S110). In this case, the bitmap image is extracted by adding in a predetermined enlargement condition.

Phase 17. The CPU 21 draws the bitmap image extracted by the trimming section 51 on the display screen by the drawing section 53 (Step S111).

Figure 16:
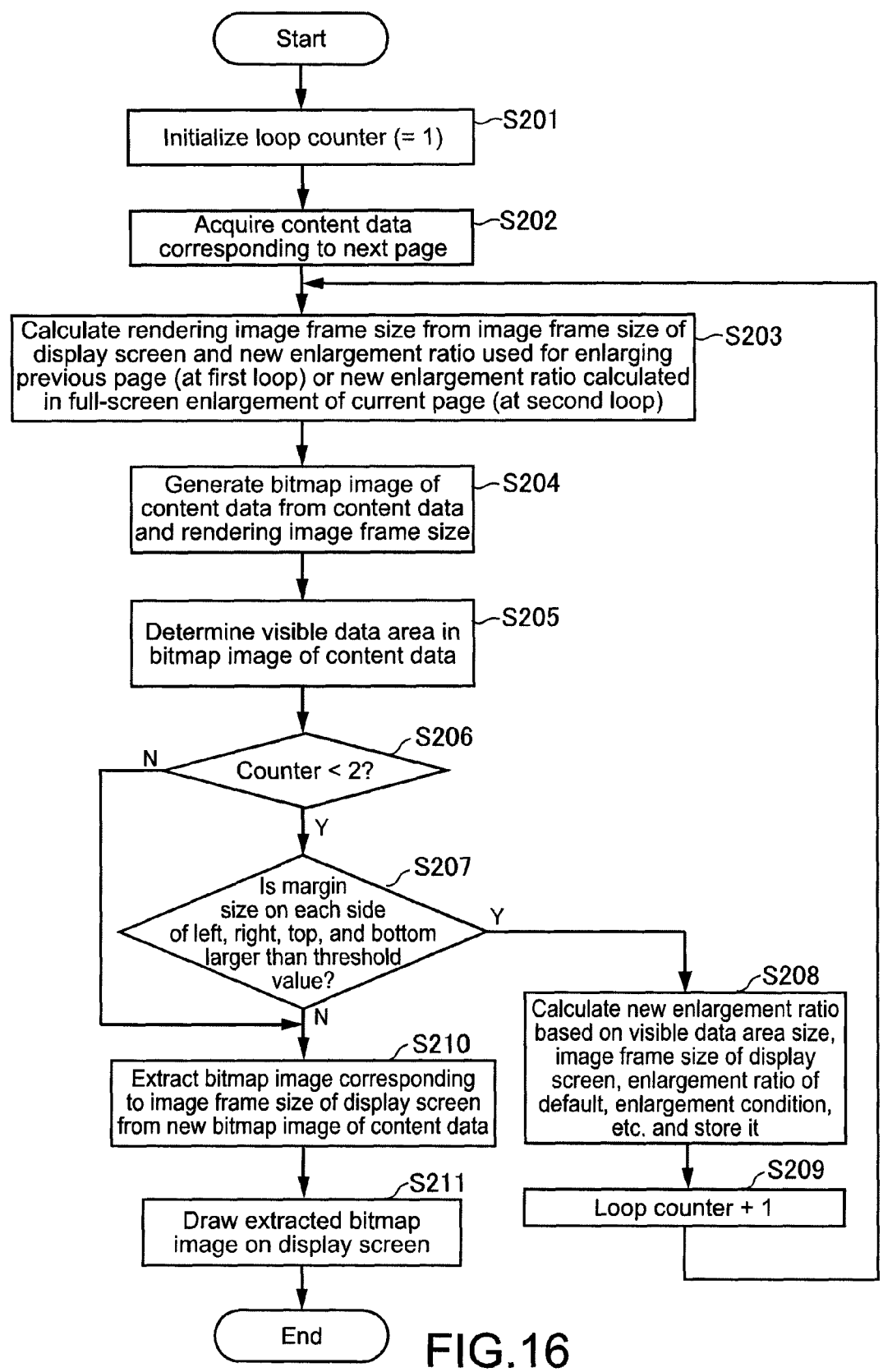
FIG. 16 is a flowchart showing a flow of the full-screen enlargement continuously performed on a subsequent page in the electronic book reader of FIG. 1.

After that, an operation performed in a case where the user makes a touch operation to the page-forward button 13b is as follows. FIG. 16 is a flowchart showing a flow of the full-screen enlargement continuously performed on the next page.

After initializing the loop counter (Step S201), the CPU 21 acquires content data of the next page (Step S202).

Next, the CPU 21 calculates, by the rendering image frame calculation section 41, a size of a rendering image frame from the size of the image frame of the display screen and the enlargement ratio that is used for the full-screen enlargement with respect to the previous page and stored in the storage 55 (Step S203). In other words, the CPU 21 uses the enlargement ratio stored in the storage 55 as an enlargement ratio of default.

Subsequent processing in Steps S204 to 211 are similar to processing in Steps S104 to 111 of the full-screen enlargement for the first page, shown in FIG. 6. In a case where a layout of the next page is the same as that of the previous page, the CPU 21 merely needs to extract a bitmap image corresponding to the size of the image frame of the display screen from the bitmap image enlarged at the new enlargement ratio stored in the storage 55 and draw the extracted bitmap image on the display screen by the drawing section 53, with the result that the CPU 21 can achieve full-screen enlargement without calculating a new enlargement ratio again.

It should be noted that in Step S207, it is judged not only whether a distance between the image frame of the display screen and the visible data area on each side of the left and right and the top and bottom (size of margin) is larger than the threshold value, but also whether the visible data area is larger than the image frame of the display screen. In a case where it is judged that the visible data area is larger than the image frame of the display screen, processing of calculating a new enlargement ratio or reduction ratio is executed in Step S208, and then processing of generating a bitmap image again at the new enlargement ratio or reduction ratio is executed in Step S203.

(Example of Full-Screen Enlargement of Page)

FIG. 7A is a display image of content data drawn on the display screen before enlargement. At this time, a margin with a relatively large width exist between the image frame of the display screen and the visible data area. Such a relatively-large margin is generated, for example, in a case where a letter "F" that is the head of the second line is intended to be arranged after a letter "E" of the first line, and a width size of one line is thus slightly made larger than a width size of the image frame of the display screen, as shown in FIG. 7A. FIG. 7B is an enlarged bitmap image generated at a new enlargement ratio. FIG. 7C shows a result obtained by extracting a bitmap image corresponding to the size of the image frame of the display screen from the enlarged bitmap image of FIG. 7B and displaying the extracted bitmap image on the display screen.

As described above, according to the electronic book reader 100 of this embodiment, the display image of the content data enlarged by making almost full use of the image frame of the display screen can be obtained by a single instruction given by the user. There is another advantage that an image quality of a font is not impaired when an enlargement ratio is selected and the enlargement is made under restriction of the font size. It should be noted that regarding image data, a selection of enlargement or no enlargement should be made according to a type of a format thereof.

(Processing Based on Enlargement Condition)

The enlargement condition refers to a condition that defines how to arrange a visible data area in the image frame of the display screen to enlarge a bitmap image.

The enlargement condition includes the following items, for example.

1. Fix a center position of a bitmap image frame to enlarge in a biaxial direction (see FIG. 8).

2. Keep a center position of a width (lateral width) in an X-axis direction of the bitmap image frame fixed to enlarge in the biaxial direction so that an upper end of a visible data area comes close to an upper end of the image frame in a Y-axis direction (see FIG. 9).

3. Align the center position of the visible data area with the center position of the bitmap image frame to enlarge in the biaxial direction so that any end of the visible data area comes close to an end of the bitmap image frame (see FIG. 10).

4. Align the center position in the lateral width of the visible data area with the center position in the width (lateral width) in the X-axis direction of the bitmap image frame to enlarge in the biaxial direction so that the upper end of the visible data area comes close to the upper end of the image frame in the Y-axis direction (see FIG. 11).

It should be noted that in FIGS. 8 to 11, FIGS. 8A, 9A, 10A, and 11A each show that a page in which the visible data area is arranged on about an upper half side of the bitmap image frame is enlarged, FIGS. 8B, 9B, 10B, and 11B each show that a page in which the visible data area is arranged at the center portion of the bitmap image frame on the Y axis is enlarged, FIGS. 8C, 9C, 10C, and 11C each show that a page in which the visible data area is arranged on about a half of the right-hand side of the bitmap image frame is enlarged, and FIGS. 8D, 9D, 10D, and 11D each show that a page in which the visible data area is arranged on an upper right-hand side of the bitmap image frame is enlarged.

The above enlargement conditions 1 to 4 can particularly provide variation in enlarging a page having the following layout structures.

FIGS. 12 to 15 are diagrams each showing an example of a layout structure of electronic book data.

Figure 12:
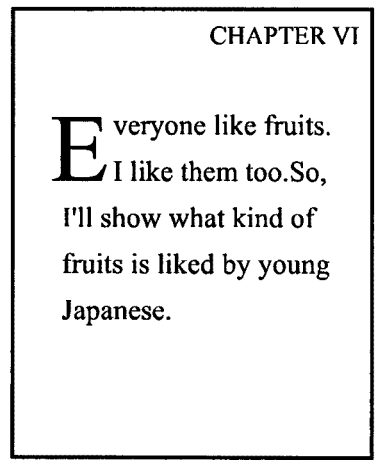
FIG. 12 is a diagram showing an example of a layout structure of electronic book data.

FIG. 12 is a page in which text data is arranged only on about an upper half side. According to the enlargement conditions 1 to 4, the enlargement processing as shown in FIGS. 8A, 9A, 10A, and 11A is performed on that page.

Figure 13:
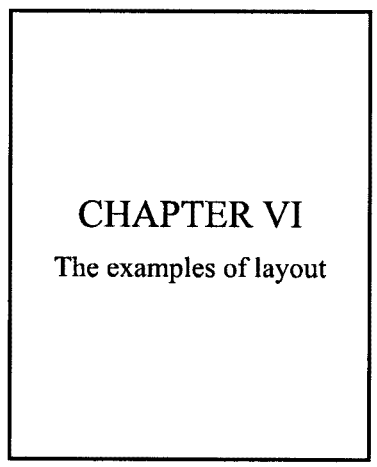
FIG. 13 is a diagram showing an example of another layout structure of the electronic book data.

FIG. 13 is a page in which the text data is arranged only at the center potion (chapter page). According to the enlargement conditions 1 to 4, the enlargement processing as shown in FIGS. 8B, 9B, 10B, and 11B is performed on that page.

Figure 14:
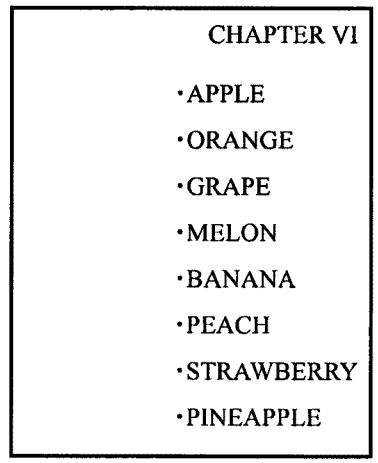
FIG. 14 is a diagram showing an example of still another layout structure of the electronic book data.

FIG. 14 is a page in which the text data is arranged on about a half of the right-hand side. According to the enlargement conditions 1 to 4, the enlargement processing as shown in FIGS. 8C, 9C, 10C, and 11C is performed on that page.

Figure 15:
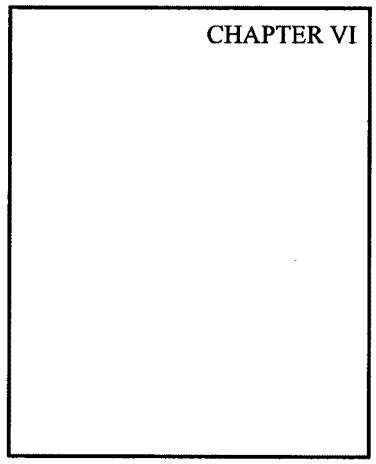
FIG. 15 is a diagram showing an example of still another layout structure of the electronic book data.

FIG. 15 is a page in which the text data is arranged only on an upper right-hand side. According to the enlargement conditions 1 to 4, the enlargement processing as shown in FIGS. 8D, 9D, 10D, and 11D is performed on that page.

A new enlargement ratio may differ depending on set enlargement conditions. Particularly, when the page in which the visible data area is arranged on the upper right-hand side of the bitmap image frame is enlarged (FIGS. 8D, 9D, 10D, and 11D), the difference is large. Moreover, the difference in enlargement condition causes a difference in a position at which a bitmap image corresponding to a size of an image frame of the display screen is extracted from a new bitmap image of content data.

In every case where any of the enlargement conditions is set, a rough layout of a display image before enlargement is not disturbed in the electronic book reader 100, with the result that the enlargement operation can be performed without causing unconformable feeling. In particular, in a case where the enlargement condition 1 is adopted, the feature of the layout of electronic book data is kept the best before and after the enlargement.

As described above, the case where the information processing apparatus according to the embodiment of the present invention is structured as an electronic book reader has been described, but the present invention is not limited thereto. For example, in an apparatus capable of reproducing and displaying content data including an image such a photo and an illustration, when a margin exists in an outer edge portion of the image, the present invention can be applied in order to enlarge the entire image and display the image excluding the margin.

The present invention is not limited to only the above embodiment and can variously be modified without departing from the gist of the present invention.

The present application contains subject matter related to that disclosed in U.S. Priority Patent Application No. 61/257,304 filed in the United States Patent and Trademark Office on Nov. 2, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
   a display including a screen;
   a generation mechanism that generates an image of content data including visible data;
   a determination mechanism that determines as a visible data area an area surrounding
   another area in which the visible data is arranged in the generated image, the visible data area corresponding to a shape of the screen, and the generated image including a first margin between the visible data area and a frame of the screen; and
   a controller having a processor that controls the generation mechanism to generate an enlarged image obtained by enlarging the image so that a size of the screen and a size of the visible data area become closer to each other, controls the determination mechanism to determine the visible data area in the enlarged image, and extracts the visible data area from the enlarged image to display the visible data area on the screen, wherein
   the controller is configured to display on a predetermined area of the screen an enlargement/reduction screen including user-selectable prompts to select more detailed enlargement/reduction instructions that include a plurality of user-selectable enlargement/reduction instruction areas that when actuated respectively issue commands to selectively enlarge or reduce an image of content data at a fixed ratio, and include another user-selectable area that when selected enlarges the image of the content data so that the size of the screen and the size of the visible data area become closer to each other,
   wherein a second enlargement ratio used for generating the enlarged image so that the size of the screen and the size of the visible data area become closer to each other is determined by adding a restriction of a type of a font size designated by the content data, by (i) calculating a first enlargement ratio that includes a second margin corresponding to a calculation error, (ii) calculating a first font size corresponding to the first enlargement ratio, (iii) calculating a second font size that is a largest font size of a set of predetermined font sizes designated by the type of the font size designated by the content data, the second font size being smaller than the first font size, and (iv) calculating the second enlargement ratio corresponding to the second font size.

2. The information processing apparatus according to claim 1, further comprising:
   a storage device that stores the enlargement ratio used for generating the enlarged image by the generation mechanism,
   wherein when the image of the content data is divided into a plurality of pages to be displayed on the screen, the controller stores in the storage device the enlargement ratio used for generating the enlarged image of a previous page and generates, by the generation mechanism, the enlarged image of a next page by using the stored enlargement ratio.

3. The information processing apparatus according to claim 1, wherein when a difference between the size of the screen and the size of the visible data area is larger than a threshold value, the controller generates, by the generation mechanism, the enlarged image obtained by enlarging the image so that the size of the screen and the size of the visible data area become closer to each other, determines, by the determination mechanism, the visible data area in the enlarged image, and extracts the visible data area from the enlarged image to display the visible data area on the screen, and when the difference between the size of the screen and the size of the visible data area is equal to or smaller than the threshold value, the controller extracts the visible data area from the image to display the visible data area on the screen.

4. The information processing apparatus according to claim 1,
wherein the controller causes the generation mechanism to generate, the enlarged image that is enlarged with a center position of the image being fixed.

5. The information processing apparatus according to claim 1,
wherein the controller causes the generation mechanism to generate by the generation means, the enlarged image that is enlarged so that an upper end of the visible data area comes close to an upper end of the screen with a center position of a lateral width of the image being fixed.

6. The information processing apparatus according to claim 1,
wherein the controller causes the generation mechanism to generate the enlarged image that is enlarged so that any end of the visible data area comes close to an end of the screen with a center position of the visible data area being aligned with a center position of the image.

7. The information processing apparatus according to claim 1,
wherein the controller causes the generation mechanism to generate the enlarged image that is enlarged so that an upper end of the visible data area comes close to an upper end of the screen with a center position of a lateral width of the visible data area being aligned with a center position of a lateral width of the image.

8. The information processing apparatus according to claim 4,
wherein the content data is electronic book data.

9. The information processing apparatus according to claim 1, further comprising:
a casing including a main surface that includes the screen of the display; and
a touch panel sensor provided to the screen of the display that is configured to detect a touch operation on the enlargement/reduction screen,
wherein the controller controls the generation mechanism to generate the enlarged image obtained by enlarging the image so that the size of the screen and the size of the visible data area become close to each other when the touch operation on the another user-selectable area of the enlargement/reduction screen is detected by the touch panel sensor.

10. An image enlargement processing method, comprising:
generating an image of content data; determining as a visible data area an area surrounding another area in which visible data is arranged in an image generated in the generating step, the visible data area corresponding to a shape of a screen of a display, and the image including a first margin between the visible data area and a frame of the display; and
causing with a processor to generate in the generating step an enlarged image obtained by enlarging the image so that a size of the screen and a size of the visible data area become closer to each other, causing in the determining step to determine the visible data area in the enlarged image, and extracting the visible data area from the enlarged image to display the visible data area on the screen, wherein
the causing includes causing the processor to display on a predetermined area of the screen an enlargement/reduction screen including user-selectable prompts to select more detailed enlargement/reduction instructions that include a plurality of user-selectable enlargement/reduction instruction areas that when actuated respectively issue commands to selectively enlarge or reduce an image of content data at a fixed ratio, and includes another user-selectable area that when selected enlarges the image of the content data so that the size of the screen and the size of the visible data area become closer to each other, wherein an enlargement ratio used for generating the enlarged image so that the size of the screen and the size of the visible data area become closer to each other is determined so font sizes by adding a restriction of a type of a font size designated by the content data, by (i) calculating a first enlargement ratio that includes a second margin corresponding to a calculation error, (ii) calculating a first font size corresponding to the first enlargement ratio, (iii) calculating a second font size that is a largest font size of a set of predetermined font sizes designated by the type of the font size designated by the content data, the second font size being smaller than the first font size, and (iv) calculating the second enlargement ratio corresponding to the second font size.

11. A non-transitory computer program product having computer readable instructions that when executed by a processor cause a computer to implement components comprising:
means for generating an image of content data including visible data; means for determining as a visible data area an area surrounding another area in which the visible data is arranged in the generated image, the visible data area corresponding to a shape of a screen of a display, and the generated image including a first margin between the visible data area and a frame of the screen; and
a control means for generating, by the means for generating, an enlarged image obtained by enlarging the image so that a size of the screen and a size of the visible data area become closer to each other, determining, by the means for determining, the visible data area in the enlarged image, and extracting the visible data area from the enlarged image to display the visible data area on the screen, wherein the control means is further for displaying on a predetermined area of the screen an enlargement/reduction screen including user-selectable prompts to select more detailed enlargement/reduction instructions that include a plurality of user-selectable enlargement/reduction instruction areas that when actuated respectively issue commands to selectively enlarge or reduce an image of content data at a fixed ratio, and including another user-selectable area that when selected enlarges the image of the content data so that the size of the screen and the size of the visible data area become closer to each other,
wherein an enlargement ratio used for generating the enlarged image so that the size of the screen and the size of the visible data area become closer to each other is determined by adding a restriction of a type of a font size designated by the content data, by (i) calculating a first enlargement ratio that includes a second margin corresponding to a calculation error, (ii) calculating a first font size corresponding to the first enlargement ratio, (iii) calculating a second font size that is a largest font size of a set of predetermined font sizes designated by the type of the font size designated by the content data, the second font size being smaller than the first font size, and (iv) calculating the second enlargement ratio corresponding to the second font size.

12. An information processing apparatus, comprising: a display section including a screen; a generation section to generate an image of content data including visible data; a determination section to determine as a visible data area an area surrounding another area in which the visible data is arranged in the generated image, the visible data area corresponding to a shape of the screen, and the generated image including a first margin between the visible data area and a frame of the screen; and a control section to generate, by the generation section, an enlarged image obtained by enlarging the image so that a size of the screen and a size of the visible data area become closer to each other, determine, by the determination section, the visible data area in the enlarged image, and extract the visible data area from the enlarged image to display the visible data area on the screen, wherein the control section is further configured to display on a predetermined area of the screen an enlargement/reduction screen including user-selectable prompts to select more detailed enlargement/reduction instructions that include a plurality of user-selectable enlargement/reduction instruction areas that when actuated respectively issue commands to selectively enlarge or reduce an image of content data at a fixed ratio, and include another user-selectable area that when selected enlarges the image of the content data so that the size of the screen and the size of the visible data area become closer to each other, wherein an enlargement ratio used for generating the enlarged image so that the size of the screen and the size of the visible data area become closer to each other is determined so adding a restriction of a type of a font size designated by the content data, by (i) calculating a first enlargement ratio that includes a second margin corresponding to a calculation error, (ii) calculating a first font size corresponding to the first enlargement ratio, (iii) calculating a second font size that is a largest font size of a set of predetermined font sizes designated by the type of the font size designated by the content data, the second font size being smaller than the first font size, and (iv) calculating the second enlargement ratio corresponding to the second font size.

13. The information processing apparatus according to claim 1, wherein the visible data area extracted from the enlarged image is displayed on the screen such that the margin is not displayed.

14. The information processing apparatus according to claim 1, further comprising:

a storage device that stores the enlargement ratio used for generating the enlarged image by the generation mechanism, wherein when the image of the content data is divided into a plurality of pages to be displayed on the screen, the controller stores in the storage device the enlargement ratio used for generating the enlarged image of a previous page and generates, by the generation mechanism, the enlarged image of a next page by using the stored enlargement ratio when a layout of the next page is the same as that of the previous page.

15. The information processing apparatus according to claim 1, further comprising:

a storage device that stores the enlargement ratio used for generating the enlarged image by the generation mechanism, wherein the enlargement ratio is stored as a value slightly smaller than a calculated enlargement ratio.

* * * * *